US011978403B2

(12) United States Patent
Pyun et al.

(10) Patent No.: US 11,978,403 B2
(45) Date of Patent: May 7, 2024

(54) DISPLAY DEVICE AND DRIVING METHOD THEREOF

(71) Applicant: Samsung Display Co., Ltd., Yongin-Si (KR)

(72) Inventors: Ki Hyun Pyun, Yongin-si (KR); Jin Won Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/113,602

(22) Filed: Feb. 23, 2023

(65) Prior Publication Data

US 2024/0071313 A1 Feb. 29, 2024

(30) Foreign Application Priority Data

Aug. 30, 2022 (KR) ........................ 10-2022-0109498

(51) Int. Cl.
*G09G 3/3266* (2016.01)
*G09G 3/3291* (2016.01)

(52) U.S. Cl.
CPC ......... *G09G 3/3266* (2013.01); *G09G 3/3291* (2013.01); *G09G 2300/0842* (2013.01); *G09G 2310/061* (2013.01); *G09G 2310/08* (2013.01); *G09G 2360/14* (2013.01)

(58) Field of Classification Search
CPC ............... G09G 3/3266; G09G 3/3291; G09G 2300/0842; G09G 2310/061; G09G 2310/08; G09G 2360/14
See application file for complete search history.

(56) References Cited

U.S. PATENT DOCUMENTS

| | | | | |
|---|---|---|---|---|
| 11,348,512 B2 | 5/2022 | Kim et al. | | |
| 2016/0012798 A1* | 1/2016 | Oh | G09G 3/3283 | 345/82 |
| 2021/0201814 A1* | 7/2021 | Choi | G09G 3/3266 | |
| 2022/0199018 A1* | 6/2022 | Jeon | G09G 3/3233 | |
| 2023/0010366 A1* | 1/2023 | Son | G09G 3/3266 | |

FOREIGN PATENT DOCUMENTS

| | | |
|---|---|---|
| KR | 10-2021-0050050 A | 5/2021 |
| KR | 10-2021-0050384 A | 5/2021 |

* cited by examiner

*Primary Examiner* — Lixi C Simpson
(74) *Attorney, Agent, or Firm* — Innovation Counsel LLP

(57) ABSTRACT

A display device for performing a sensing operation according to an embodiment of the present inventive concept includes a pixel unit including pixel circuits each including a light emitting element, a driving transistor, a switching transistor, and a sensing control transistor connected between an anode electrode and an initialization power source; a scan driver connected to the pixel circuits through horizontal lines and sequentially outputting scan signals and sensing control signals; and a sensing unit configured to sense voltages or current of first nodes each disposed between an anode electrode and a driving transistor. The scan driver simultaneously outputs the sensing control signals to the horizontal lines at every predetermined discharge cycle.

20 Claims, 10 Drawing Sheets

DISPLAY DEVICE AND DRIVING METHOD THEREOF

CROSS-REFERENCE TO RELATED APPLICATION

The application claims priority to and the benefit of Korean Patent Application No. 10-2022-0109498, filed Aug. 30, 2022, which is hereby incorporated by reference for all purposes as if it is fully set forth herein.

BACKGROUND

1. Field

The present inventive concept relates to a display device and a driving method thereof.

2. Discussion

With the development of information technology, the importance of display devices, which are a connection medium between users and information, has been emphasized. In response to this, the use of display devices such as a liquid crystal display device, an organic light emitting display device, and the like has been increasing.

The organic light emitting display device may include a plurality of pixel circuits and organic light emitting elements to output an image corresponding to image data received from outside. In a manufacturing process of the organic light emitting display device, when a pattern of a specific pixel circuit is defective or foreign substances are introduced, a light spot defect may occur in the specific pixel. In this case, when the display device is driven, an unintended light spot may be generated on a specific portion of a display panel, thereby degrading the quality of the display panel.

SUMMARY

According to embodiments of the present inventive concept, a display device capable of preventing unintended occurrence of a light spot when the display device is driven or in a sensing operation can be provided.

A display device for performing a sensing operation according to an embodiment of the present inventive concept may include a pixel unit including a plurality of pixel circuits each including a light emitting element, a driving transistor connected between an anode electrode of the light emitting element and a first power source, a switching transistor connected between a gate electrode of the driving transistor and a data line, and a sensing control transistor connected between the anode electrode and an initialization power source; a scan driver connected to the plurality of pixel circuits through a plurality of horizontal lines and sequentially outputting scan signals for turning on the plurality of switching transistors included in the plurality of pixel circuits and sensing control signals for turning on sensing control transistors included in the plurality of pixel circuits to the plurality of horizontal lines; and a sensing unit configured to sense voltages or current of a plurality of first nodes each disposed between a respective anode electrode and a respective driving transistor. The scan driver may simultaneously output the sensing control signals to the horizontal lines at every predetermined discharge cycle during the sensing operation.

In an embodiment, each of the plurality of pixel circuits may further include a storage capacitor connected between the first node and a second node disposed between the gate electrode of the driving transistor and the switching transistor; and the initialization power source is connected to one electrode of each of the sensing control transistors in parallel with the sensing unit to supply a first initialization voltage to the first node during the sensing operation.

In an embodiment, the display device may further include a timing controller controlling the sensing unit and the scan driver. The timing controller may control the sensing unit and the scan driver so that the each of the sensing control transistors is turned on at every predetermined discharge cycle during the sensing operation to supply a second initialization voltage from the initialization power source to the first node.

In an embodiment, a level of the second initialization voltage may be higher than a level of the first initialization voltage.

In an embodiment, a voltage applied to the gate electrode of the driving transistor through the data line during the sensing operation may be a voltage corresponding to a black grayscale.

In an embodiment, the sensing operation may be performed during any one of a period in which the display device is powered on, a period in which the display device is powered off, or a blank period in which input image data is not input within one frame while the display device is driven.

In an embodiment, the sensing operation may be an operation for acquiring at least one of a threshold voltage and mobility of the driving transistor.

In an embodiment, a discharge period of the sensing operation for acquiring the threshold voltage of the driving transistor may be longer than a discharge period of the sensing operation for acquiring the mobility of the driving transistor.

In an embodiment, the scan driver may simultaneously provide the scan signals together with the sensing control signals to the plurality of horizontal lines at every predetermined discharge cycle.

According to an embodiment of the present inventive concept, a driving method of a display device including a plurality of pixel circuits connected to a plurality of horizontal lines, each of the plurality of pixel circuits including a light emitting element and a driving transistor connected between the light emitting element and a first power source, may include sequentially providing scan signals, each of the scan signals being configured to turn on a switching transistor connected between the driving transistor and a data line and sensing control signals, each of the sensing control signals being configured to turn on a sensing control transistor connected between a respective first node, which is disposed between the driving transistor and an anode electrode of the light emitting element, and an initialization power source to the plurality of horizontal lines; sensing voltages or current of a plurality of first nodes each disposed between the driving transistor and the anode electrode of the light emitting element; and simultaneously providing the sensing control signal to the plurality of horizontal lines at every predetermined discharge cycle during a sensing operation.

In an embodiment, each of the plurality of pixel circuits may further include a storage capacitor connected between a gate electrode of the driving transistor and the anode electrode. An amount of charges accumulated in the parasitic capacitor in each of the plurality of pixel circuits may be discharged when a sensing control signal is applied to a gate electrode of the sensing control transistor at every predetermined discharge cycle.

In an embodiment, the sequentially providing the scan signals and the sensing control signals, the sensing the voltages or the current of the plurality of first nodes, and the simultaneously providing the sensing control signals may be performed during any one of a period in which the display device is powered on, a period in which the display device is powered off, or a blank period in which input image data is not input within one frame while the display device is driven.

In an embodiment, the driving method may further include acquiring information on a threshold voltage or mobility of the driving transistor based on a sensed voltage or current of a respective first node.

In an embodiment, a discharge period when information on the threshold voltage of the driving transistor is acquired may be longer than a discharge period when information on the mobility of the driving transistor is acquired.

In an embodiment, the simultaneously providing the sensing control signals to the plurality of horizontal lines at every predetermined discharge cycle may include simultaneously providing the plurality of scan signals for turning on switching transistors included in the plurality of pixel circuits to the plurality of horizontal lines together with the sensing control signals at every predetermined discharge cycle.

In an embodiment, the sequentially providing the sensing control signals to the plurality of horizontal lines may include providing a first initialization voltage from the initialization power source to the plurality of first nodes in the plurality of pixel circuits. The simultaneously providing the sensing control signals to the plurality of horizontal lines at every predetermined discharge cycle may include providing a second initialization voltage from the initialization power source to the plurality of first nodes in the plurality of pixel circuits.

In an embodiment, a level of the second initialization voltage may be higher than a level of the first initialization voltage.

In an embodiment, the driving method may further include applying a data voltage to a gate electrode of the driving transistor through the data line. The data voltage may be a voltage corresponding to a black grayscale.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
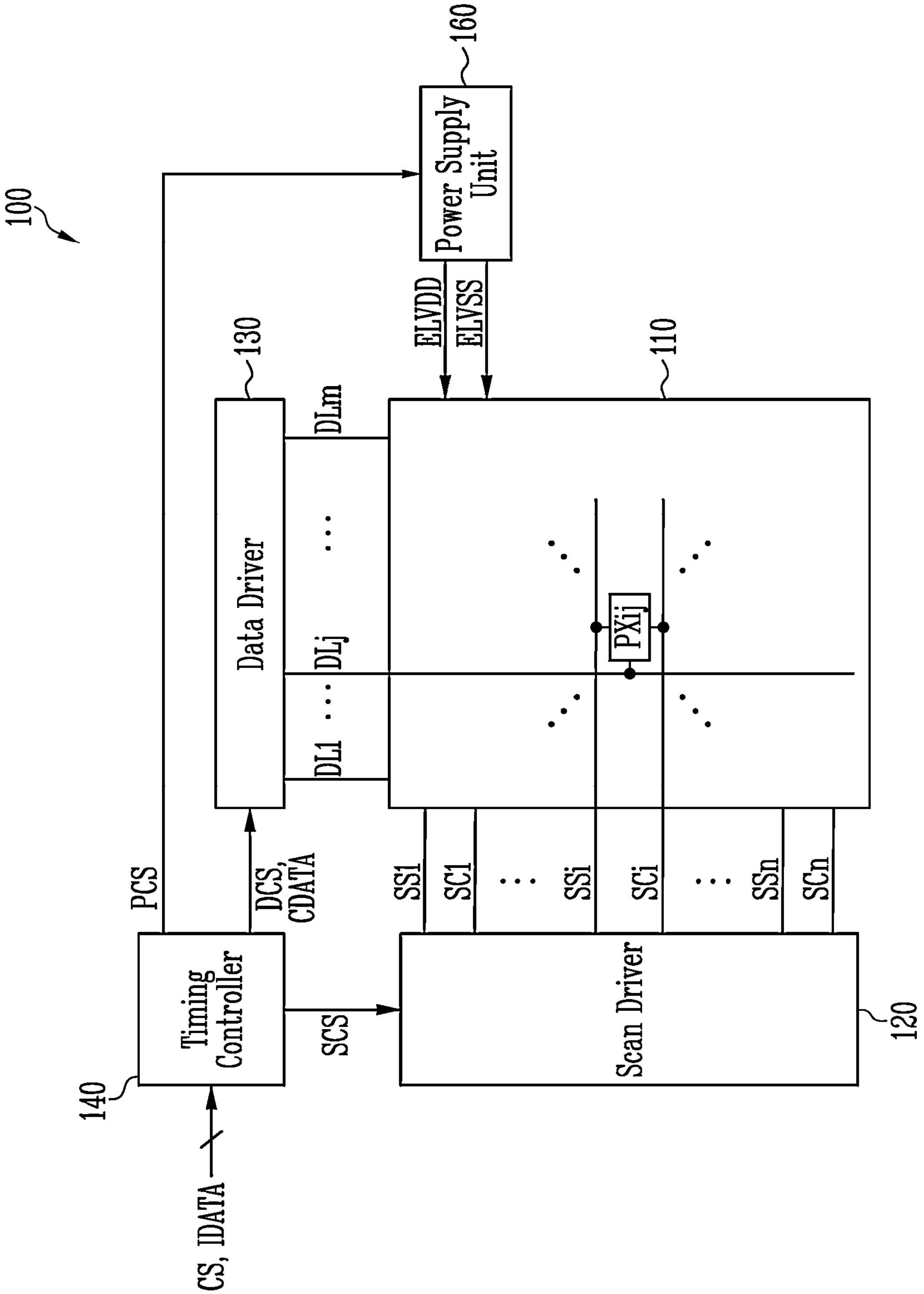
FIG. 1 is a block diagram of a display device according to an embodiment.

Hereinafter, various embodiments of the present inventive concept will be described in detail with reference to the accompanying drawings so that those of ordinary skill in the art may easily implement the present inventive concept. The present inventive concept may be embodied in various different forms and is not limited to the embodiments described herein.

In order to clearly describe the present inventive concept, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present inventive concept is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

FIG. 1 is a block diagram of a display device according to an embodiment.

Referring FIG. 1, a display device 100 according to an embodiment may include a pixel unit 110, a scan driver 120, a data driver 130, a timing controller 140, and a power supply unit 160.

The display device 100 may be a flat panel display device, a flexible display device, a curved display device, a foldable display device, or a bendable display device. Also, the display device may be applied to a transparent display device, a head-mounted display device, a wearable display device, and the like. Also, the display device 100 may be applied to various electronic devices such as a smart phone, a tablet, a smart pad, a TV, and a monitor.

Meanwhile, the display device 100 may be implemented as an organic light emitting display device, a liquid crystal display device, or the like. However, this is only an example, and the configuration of the display device 100 is not limited thereto. For example, the display device 100 may be a self-light emitting display device including an inorganic light emitting element.

The pixel unit 110 may include pixels PXij connected to data lines DL1 to DLm, scan lines SC1 to SCn, and sensing control lines SS1 to SSn, where m and n may be natural numbers. The pixels PXij may receive driving voltages of a first power source ELVDD and a second power source ELVSS from the power supply unit 160.

Meanwhile, although FIG. 1 shows n scan lines SC1 to SCn and sensing control lines SS1 to SSn, the present inventive concept is not limited thereto. For example, one or more control lines, scan lines, emission control lines, sensing lines, and the like may be additionally formed in the pixel unit 110 to correspond to the circuit structure of the pixel PXij.

In an embodiment, transistors included in the pixel PXij may be N-type oxide thin film transistors. For example, the oxide thin film transistor may be a low temperature polycrystalline oxide (LTPO) thin film transistor. However, this is only an example, and the N-type transistors are not limited thereto. For example, active patterns (semiconductor layers) included in the transistors may include an inorganic semiconductor (for example, amorphous silicon, polysilicon), an organic semiconductor, or the like. Also, at least one of the transistors included in the display device 100 and/or the pixel PXij may be replaced with a P-type transistor.

The timing controller 140 may generate a data driving control signal DCS, a scan driving control signal SCS, and a power source driving control signal PCS in response to synchronization signals supplied from the outside. The data driving control signal DCS generated by the timing controller 140 may be supplied to the data driver 130, the scan driving control signal SCS generated by the timing controller 140 may be supplied to the scan driver 120, and the power source driving control signal PCS generated by the timing controller 140 may be supplied to the power supply unit 160.

Also, the timing controller 140 may supply image data CDATA compensated based on input image data IDATA to the data driver 130. The input image data IDATA and the compensated image data CDATA may include grayscale information which can be displayed by the display device.

The data driving control signal DCS may include a source start signal and clock signals. The source start signal may control a sampling start time point of data. The clock signals may be used to control the sampling operation.

The scan driving control signal SCS may include a scan start signal, a control start signal, and clock signals. The scan start signal may control timing of a scan signal. The control start signal may control timing of a control signal. The clock signals may be used to shift the scan start signal and/or the control start signal.

The power source driving control signal PCS may control supply and voltage levels of the first power source ELVDD and the second power source ELVSS.

The scan driver 120 may receive the scan driving control signal SCS from the timing controller 140. The scan driver 120 receiving the scan driving control signal SCS may supply the scan signal to the scan lines SC1 to SCn.

For example, the scan driver 120 may sequentially supply the scan signal to the scan lines SC1 to SCn. When the scan signal is sequentially supplied to the scan lines SC1 to SCn, the pixels PXij connected to one of the scan lines SC1 to SCn may be selected. To this end, the scan signal may be set to a gate-on voltage (for example, a logic high level) so that the transistors included in the pixels PXij may be turned on.

In an embodiment, the display device 100 may further include a plurality of sensing control lines SS1 to SSn connected between the scan driver 120 and the pixel unit 110. The scan driver 120 may sequentially transmit a sensing control signal for controlling a sensing operation of a pixel circuit included in the pixel unit 110 to the pixel unit 110 through the sensing control lines SS1 to SSn according to the control of the timing controller 140.

Although the scan lines SC1 to SCn and the sensing control lines SS1 to SSn are shown as separate components in FIG. 1, in an embodiment, the scan lines SC1 to SCn and the sensing control lines SS1 to SSn may be the same component. That is, the scan signal and the sensing control signal may be simultaneously transmitted to the pixel unit as the same signal through a plurality of horizontal lines corresponding to each pixel row.

The data driver 130 may receive the data driving control signal DCS and the compensated image data CDATA from the timing controller 140. The data driver 130 may supply a data signal for displaying an image to the pixel unit 110 based on the compensated image data CDATA.

Although not shown in FIG. 1, the display device according to an embodiment may further include a sensing unit configured to perform a sensing operation for compensating for a difference in at least one of a threshold voltage or mobility of a driving transistor included in the pixel unit 110. In an embodiment, the sensing unit may be included in the data driver 130, and may perform the sensing operation under the control of the timing controller 140. In an embodiment, the number of sensing units may be the same as the number of pixel columns included in the pixel unit 110. That is, a plurality of pixel circuits included in each pixel column may be connected to the sensing unit corresponding to each pixel column through sensing lines. In an embodiment, the plurality of pixel circuits included in each pixel column may provide charges accumulated in a parasitic capacitor included in each pixel circuit as an output signal to the sensing unit connected to each pixel column according to the control of the timing controller 140 during the sensing operation. In another embodiment, the plurality of pixel circuits included in each pixel column may provide a voltage or current of a node positioned between the driving transistor and the light emitting element included in each pixel circuit as an output signal to the sensing unit connected to each pixel column according to the control of the timing controller 140 during the sensing operation. In an embodiment, information on the mobility or threshold voltage of the driving transistor may be acquired based on the sensed voltage or current.

The power supply unit 160 may supply the voltage of the first power source ELVDD and the voltage of the second power source ELVSS to the pixel unit 110 based on the power source driving control signal PCS. In an embodiment, the first power source ELVDD may determine a voltage (for example, a drain voltage) of a first electrode of the driving transistor, and the second power source ELVSS may determine a cathode voltage of the light emitting element.

The timing controller 140 may control the scan driver 120, the data driver 130, and the pixel unit 110 so that the sensing operation is performed at a predetermined time. In an embodiment, the sensing operation may be performed during a period in which the display device is powered on, a period in which the display device is powered off, or a blank period while the display device is driven. The blank period may mean a period in which the data signal corresponding to an input image is not input to the pixel unit within one frame when the display device is driven.

A gate electrode and a source electrode of the driving transistor included in a specific pixel circuit in the pixel unit may be short circuited due to various factors such as a defective pattern and the introduction of foreign substances in a manufacturing process. In this case, even when a voltage corresponding to a black grayscale is applied to the gate electrode of the driving transistor, a light spot defect phenomenon in which the light emitting element emits light may occur. According to an embodiment, the timing controller 140 may improve the light spot defect phenomenon by controlling the pixel unit 110, the scan driver 120, and the data driver 130 so that the charges accumulated in a parasitic capacitor of the light emitting element are discharged at every predetermined discharge cycle.

Figure 2:
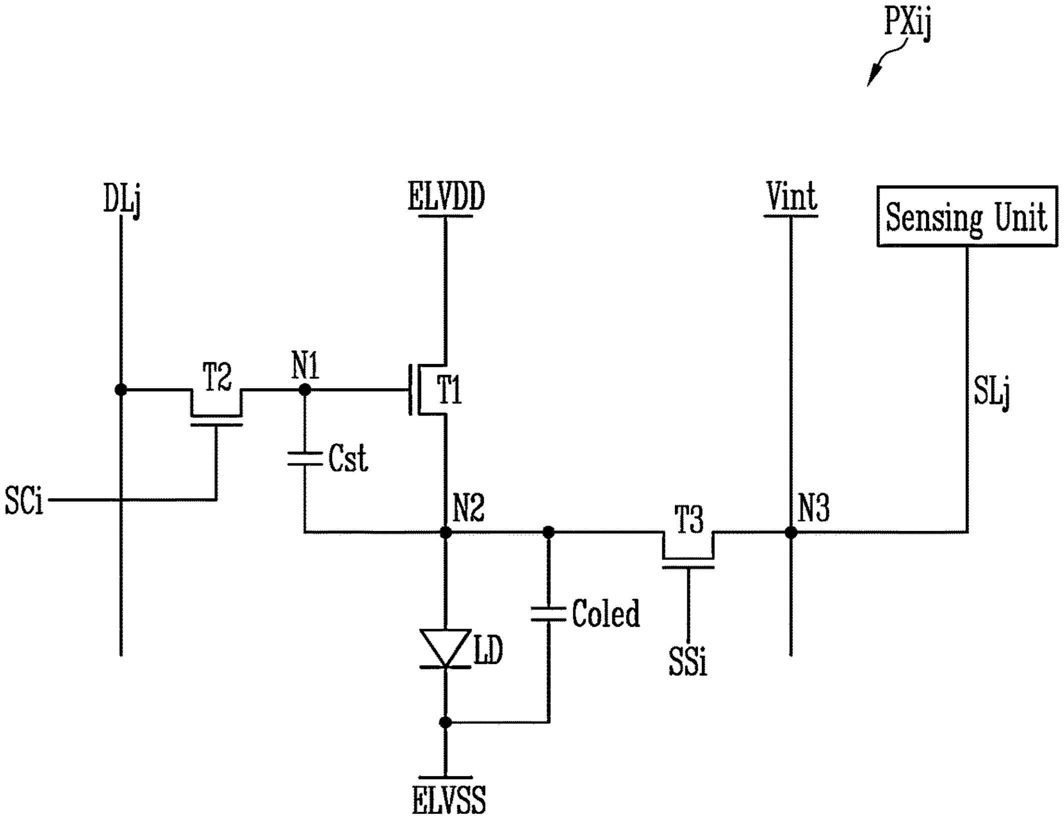
FIG. 2 is a diagram for explaining a pixel circuit according to an embodiment.

FIG. 2 is a diagram for explaining a pixel circuit according to an embodiment. FIG. 2 shows a pixel PXij positioned in a region where an i-th scan line and a j-th data line intersect as an example, but the configuration of each pixel PXij is not limited to the embodiment shown in FIG. 2.

Referring to FIG. 2, the pixel PXij may include a driving transistor T1, a switching transistor T2, a storage capacitor Cst, a light emitting element LD, and a sensing control transistor T3. In an embodiment, the light emitting element LD may further include a parasitic capacitor Coled formed by electrodes and a plurality of insulating layers disposed between the electrodes in the light emitting element LD.

The driving transistor T1 may be connected between a first power source ELVDD terminal and the light emitting element LD, and a gate electrode thereof may be connected to a first node N1. The driving transistor T1 may control the amount of current flowing from the first power source ELVDD to the second power source ELVSS via the light emitting element LD in response to a voltage of the first node N1. In an embodiment, the voltage of the first power source ELVDD may be greater than the voltage of the second power source ELVSS.

The switching transistor T2 may be connected between the data line DLj and the first node N1, and a gate electrode thereof may be connected to the scan line SCi. The switching transistor T2 may be turned on when the scan signal is supplied to the scan line SCi to electrically connect the data line DLj and the first node N1. Accordingly, the data signal may be transmitted to the first node N1.

The storage capacitor Cst may be connected between the first node N1 corresponding to the gate electrode of the driving transistor T1 and a second node N2 corresponding to a second electrode of the driving transistor T1. The storage capacitor Cst may store a voltage difference between the gate electrode and the second electrode of the driving transistor T1.

A first electrode (anode electrode or cathode electrode) of the light emitting element LD may be connected to a second electrode of the first transistor T1, and a second electrode (cathode electrode or anode electrode) of the light emitting element LD may be connected to the second power source ELVSS terminal. The light emitting element LD may generate light having a predetermined luminance in response to the amount of current (input current) supplied from the driving transistor T1.

An organic light emitting diode may be selected as the light emitting element LD. Also, an inorganic light emitting diode such as a micro light emitting diode (LED) or a quantum dot light emitting diode may be selected as the light emitting element LD. In addition, the light emitting element LD may include an organic material and an inorganic material in combination. FIG. 2 shows the pixel PXij including a single light emitting element LD. However, in another embodiment, the pixel PXij may include a plurality of light emitting elements LD, and the plurality of light emitting elements LD may be connected in series, in parallel, or in series and parallel to each other.

When the scan signal of a turn-on level (here, a logic high level) is applied through the scan line SCi, the switching transistor T2 may be turned on. In this case, a voltage corresponding to the data signal applied to the data line DLj may be stored in the first node N1 (or the storage capacitor Cst).

A driving current corresponding to a voltage difference between the first electrode and the second electrode of the storage capacitor Cst may flow between the first electrode and the second electrode of the driving transistor T1. Accordingly, the light emitting element LD may emit light with a luminance corresponding to the data signal.

In an embodiment, the pixel PXij may further include the sensing control transistor T3 connected between a second node N2 which is disposed between the second electrode of the driving transistor T1 and the first electrode of the light emitting element LD and s third node N3 connected to the sensing unit and an initialization voltage Vint. The sensing control transistor T3 may be turned on by the sensing control signal applied through a sensing control line SSi during the sensing operation to supply an initialization voltage Vint to the second node N2. The sensing control transistor T3 may be connected to the sensing unit through a sensing line SLj, and may transmit the voltage stored in the parasitic capacitor Coled to the sensing unit as an output signal during the sensing operation.

In an embodiment, the scan signal provided to the gate electrode of the switching transistor T2 and the sensing control signal provided to the gate electrode of the sensing control transistor T3 may be a same signal which is simultaneously provided to the pixel PXij through one horizontal line.

Figure 3:
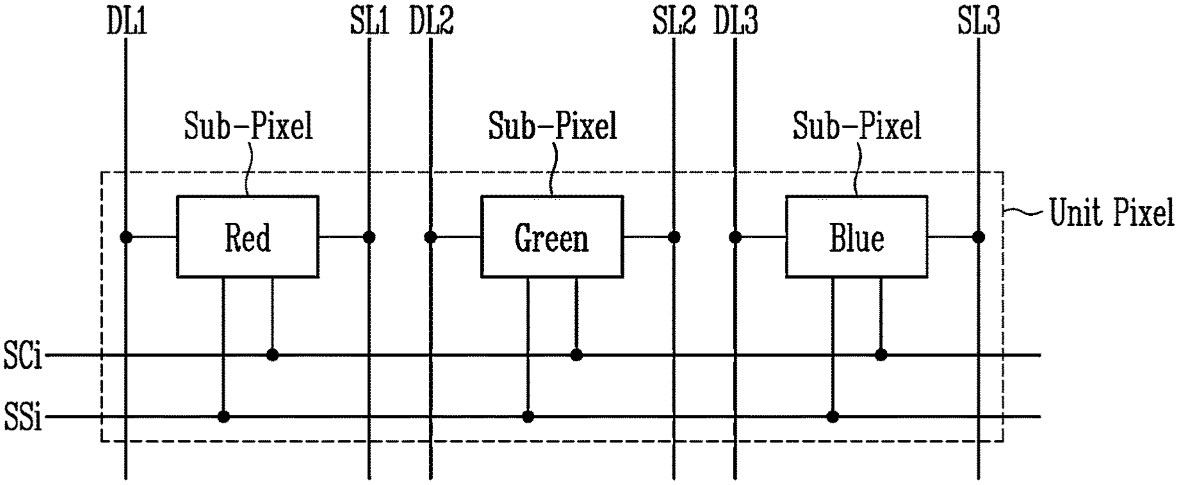
FIG. 3 is a diagram for explaining a structure of a unit pixel and sub-pixels included in the unit pixel according to an embodiment.

FIG. 3 is a diagram for explaining a structure of a unit pixel and sub-pixels included in the unit pixel according to an embodiment.

Referring to FIG. 3, the pixel unit 110 described with reference to FIG. 1 may include a plurality of sub-pixels disposed adjacent to each other in a horizontal direction. Each of the sub-pixels may be any one of a red sub-pixel Red, a green sub-pixel Green, and a blue sub-pixel Blue. The red sub-pixel Red, the green sub-pixel Green, and the blue sub-pixel Blue may constitute one unit pixel. Although not shown in the drawings, one unit pixel may further include a white sub-pixel in addition to the red, green, and blue sub-pixels. The circuit configuration of each sub-pixel may be the same as the circuit configuration described with reference to FIG. 2.

Referring to FIG. 3, each sub-pixel may be connected to a corresponding data line among the data lines DL1 to DL3, the scan line SCi, and the sensing control line SSi. The data signals corresponding to the input image or a data signal corresponding to data for the sensing operation may be applied to the data line DL. The scan signal for transferring the data signal to the gate electrode of the driving transistor T1 may be applied to the scan line SCi. The sensing control signal for transmitting a voltage stored in a parasitic capacitor included in each sub-pixel to the sensing unit may be applied to the sensing control line SSi during the sensing operation.

FIG. 3 shows an embodiment in which the scan signal and the sensing control signal are transmitted to the pixel unit through separate lines, respectively. However, the scan signal and the sensing control signal may be simultaneously transmitted to the sub-pixel through one horizontal line. For example, each sub-pixel may be connected to the scan driver through one horizontal line corresponding to each pixel row. In this case, the scan signal provided to the gate electrode of the switching transistor T2 and the sensing control signal provided to the gate electrode of the sensing control transistor T3 described in FIG. 2 may be simultaneously provided through one horizontal line.

In an embodiment, the sensing operation may be sequentially performed on each of the sub-pixels shown in FIG. 3. For example, for a plurality of pixels included in the pixel unit, the sensing operation may be sequentially performed from red sub-pixels Red included in a first pixel row to red sub-pixels Red included in the last pixel row. After the sensing operation for the red sub-pixels Red included in the last pixel row is completed, the sensing operation may be sequentially performed from green sub-pixels Green included in the first pixel row to green sub-pixels Green included in the last pixel row. After the sensing operation for the green sub-pixels Green included in the last pixel row is completed, the sensing operation may be sequentially performed from blue sub-pixels Blue included in the first pixel row to blue sub-pixels Blue included in the last pixel row. However, the order of the sensing operation is not limited to the order described above but is altered as needed.

Figure 4:
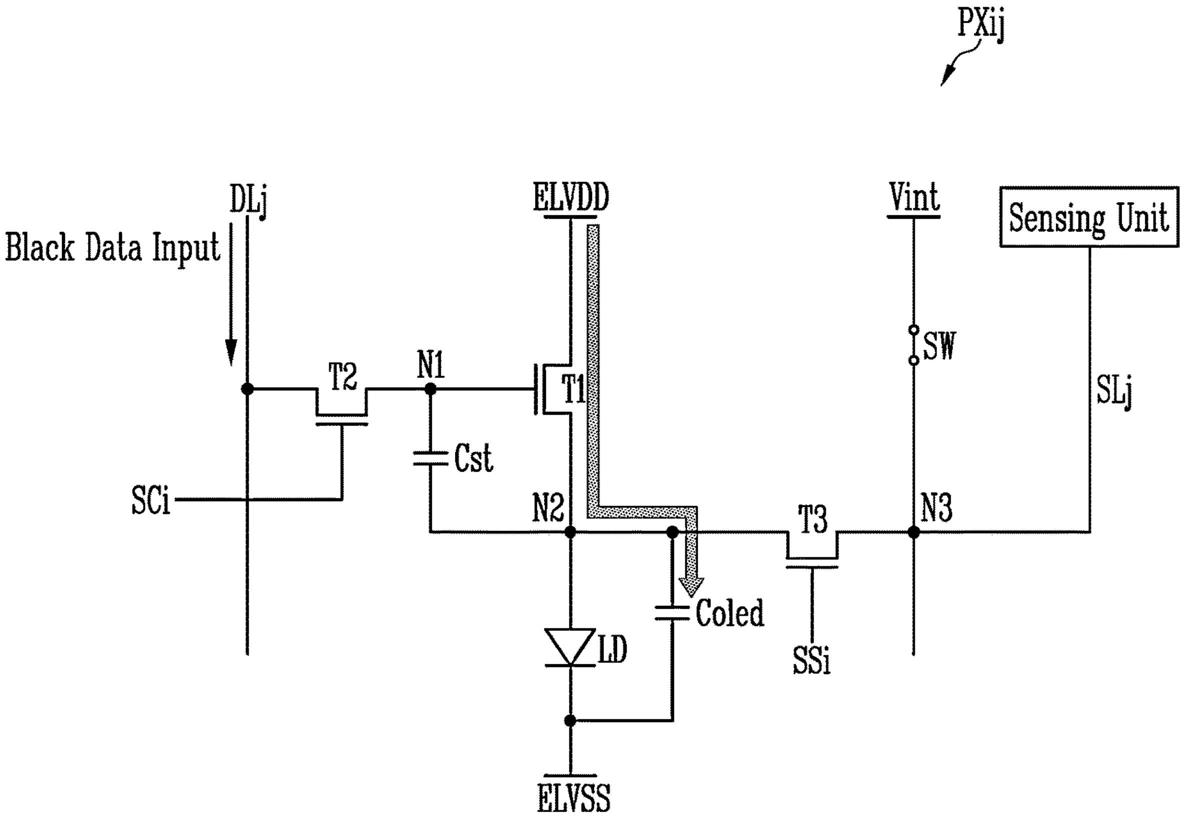
FIG. 4 is a diagram for explaining an operation of the pixel circuit during a sensing operation.

FIG. 4 is a diagram for explaining an operation of the pixel circuit during a sensing operation.

In an embodiment, a voltage corresponding to black data may be applied to the data line DLj during the sensing operation.

Referring to FIG. 4, during the sensing operation, a voltage corresponding to the black grayscale may be applied to the data line DLj, the scan signal may be applied to the gate electrode of the switching transistor T2 through the scan line SCi, and the sensing control signal may be applied to the gate electrode of the sensing control transistor T3 through the sensing control line SSi.

When the scan signal is applied to the gate electrode of the switching transistor T2, the switching transistor T2 may be turned on, and the voltage corresponding to the black grayscale may be applied to the first node N1. When the sensing control signal is applied to the gate electrode of the sensing control transistor T3, the sensing control transistor T3 may be turned on, and the initialization voltage Vint may be applied to the second node N2. In this case, a voltage difference between the first node N1 and the second node N2 may be stored in the storage capacitor Cst. Thereafter, when a switch SW between the sensing control transistor T3 and an initialization power source is opened, a driving current corresponding to the voltage stored in the storage capacitor Cst may flow between the first electrode and the second electrode of the driving transistor T1. A predetermined amount of charges may be stored in the parasitic capacitor Coled of the light emitting element LD by the current flowing through the driving transistor T1. Accordingly, the potential of the second node N2 may increase. However, in this case, the potential of the second node N2 may be lower than a threshold voltage of the light emitting element LD. Accordingly, in this case, the light emitting element LD may not emit light. In other words, since the data voltage corresponding to the black grayscale is applied to the gate electrode of the driving transistor T1 during the sensing operation, the light emitting element LD may not emit light. In an embodiment, the charges stored in the parasitic capacitor Coled may be transmitted to the sensing unit as a sensing signal. In another embodiment, a voltage or current of the second node N2 may be transmitted to the sensing unit as the sensing signal. Compensation information may be generated based on the sensing signal transmitted to the sensing unit. The compensation information may be information for compensating for the mobility or threshold voltage of the driving transistor.

Figure 5A:
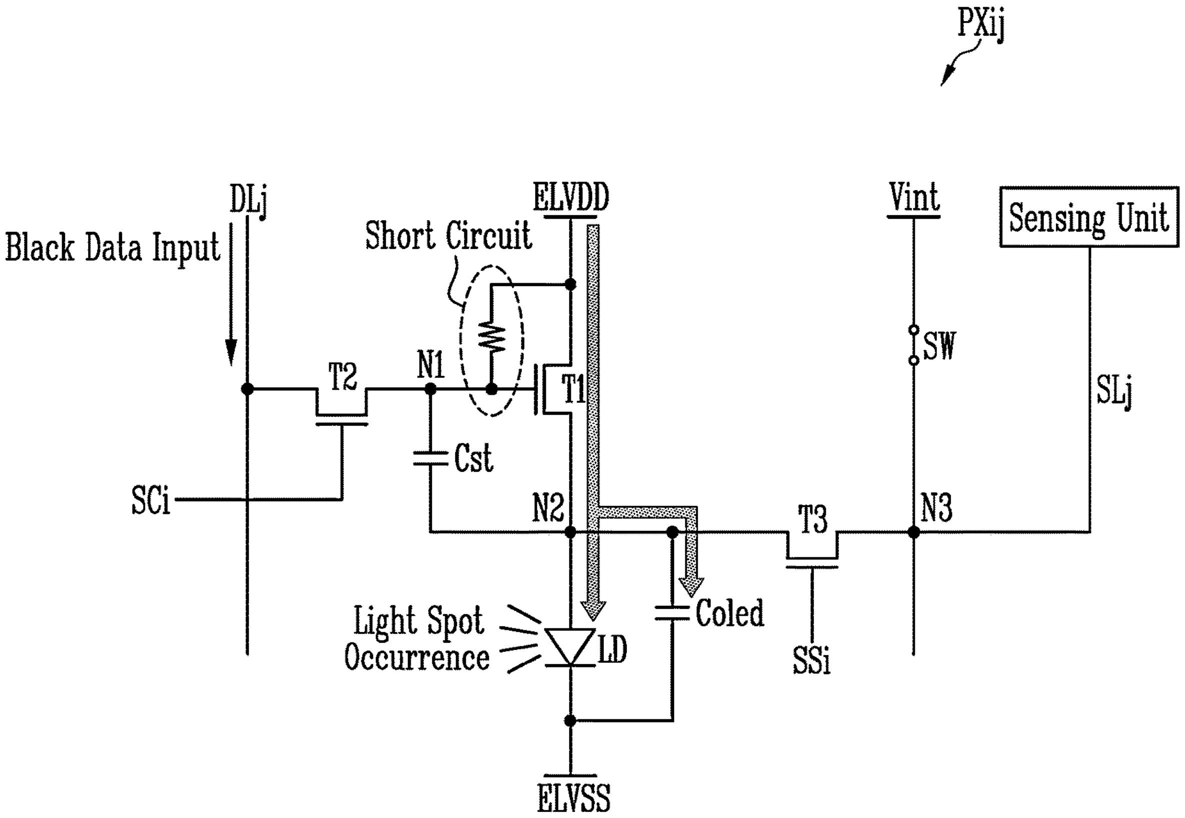
FIGS. 5A and 5B are diagrams for explaining the sensing operation of the pixel circuit when a short circuit occurs between a gate electrode and a source electrode of a driving transistor.
Figure 5B:
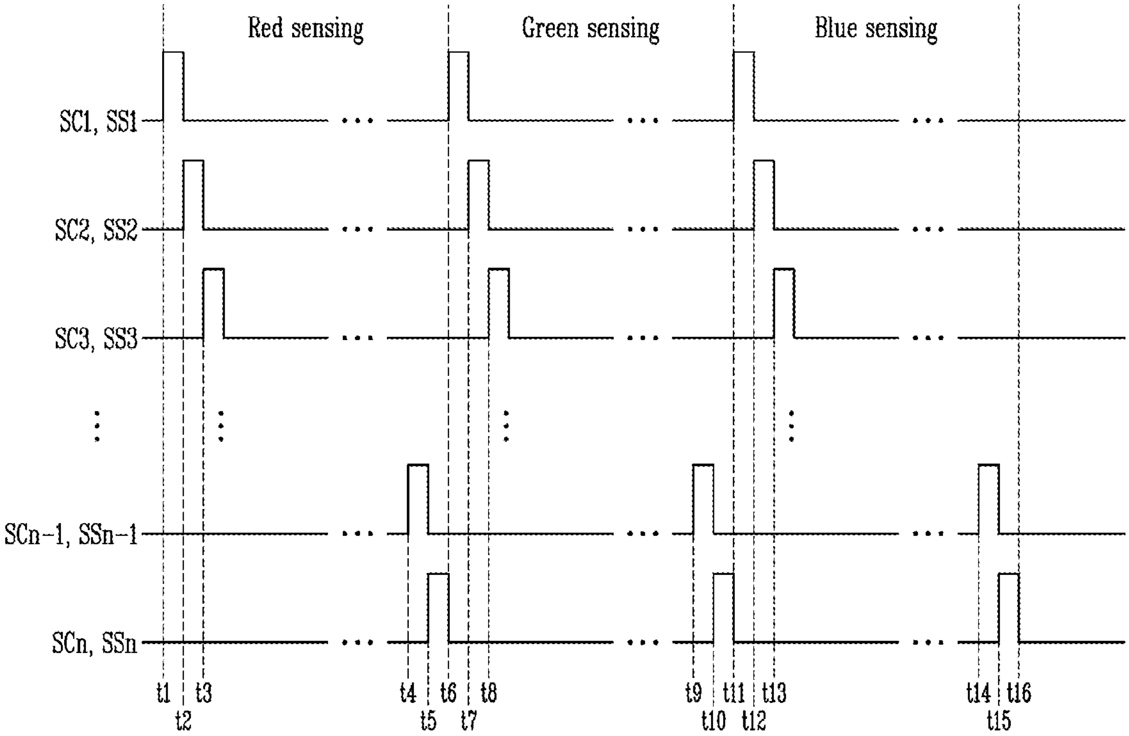

FIGS. 5A and 5B are diagrams for explaining the sensing operation of the pixel circuit when a short circuit occurs between a gate electrode and a source electrode of a driving transistor.

Since the pixel circuit of FIG. 5A is the same as the pixel circuit of FIG. 4 except that the gate electrode and the source electrode of the driving transistor are short circuited, a description of the contents overlapping with the contents described in FIG. 4 will be omitted.

Referring to FIG. 5A, when a short circuit occurs between the gate electrode and the source electrode of the driving transistor T1, even if the scan signal is not applied to the gate electrode of the switching transistor T2, a voltage having a predetermined magnitude may be applied to the gate electrode of the driving transistor T1. That is, as the gate electrode and the source electrode of the driving transistor T1 are short circuited, a current path may be formed between the first power source ELVDD and the first node N1, and accordingly the voltage having the predetermined magnitude may be applied to the first node N1. In this case, a magnitude of the voltage applied to the first node N1 by the first power source ELVDD may be greater than a magnitude of the voltage corresponding to the black grayscale.

Since the voltage having the magnitude greater than the voltage corresponding to the black grayscale is applied to the first node N1, a current having a magnitude greater than the current corresponding to the black grayscale may flow between the first electrode and the second electrode of the driving transistor T1. In this case, a voltage greater than the threshold voltage of the light emitting element may be stored in the parasitic capacitor Coled. As a result, when the gate electrode and the source electrode of the driving transistor T1 are short circuited, even when the voltage corresponding to the black grayscale is applied to the data line DLj during the sensing operation, the light emitting element LD may emit light. Accordingly, the light spot defect phenomenon may occur in the pixel unit including the corresponding pixel.

FIG. 5B is a timing diagram illustrating signals applied to the plurality of scan lines SC1 to SCn and sensing control lines SS1 to SSn connected to the pixel unit.

Referring to FIGS. 1 and 5B, the pixel unit may be connected to the scan driver 120 through the plurality of scan lines SC1 to SCn and sensing control lines SS1 to SSn. Specifically, unit pixels included in the first pixel row may be connected to a first scan line SC1 and a first sensing control line SS1. Unit pixels included in a second pixel row may be connected to a second scan line SC2 and a second sensing control line SS2. Unit pixels included in an n-th pixel row may be connected to an n-th scan line SCn and an n-th sensing control line SSn. Each of the unit pixels may include the plurality of sub-pixels Red, Green, and Blue.

As described with reference to FIG. 4, the sensing operation may be sequentially performed on the plurality of sub-pixels. Specifically, in a period from t1 to t2, the scan signal and the sensing control signal may be applied to the first scan line SC1 and the first sensing control line SS1, respectively, and the sensing operation may be performed on the red sub-pixels Red included in the first pixel row. In a period from t2 to t3, the sensing operation may be performed on the red sub-pixels Red included in the second pixel row. In this way, the sensing operation may be sequentially performed on the red sub-pixels Red connected to each pixel row.

After the sensing operation is performed on the red sub-pixels Red included in the n-th pixel row, which is the last pixel row, in a period from t5 to t6, the scan signal and the sensing control signal may be applied to the first scan line SC1 and the first sensing control line SS1, respectively, and the sensing operation may be performed on the green sub-pixels Green included in the first pixel row in a period from t6 to t7. In a period from t7 to t8, the sensing operation may be performed on the green sub-pixels Green included in the second pixel row. In this way, the sensing operation may be sequentially performed on the green sub-pixels Green connected to each pixel row.

After the sensing operation is performed on the green sub-pixels Green included in the n-th pixel row in a period from t10 to t11, which is the last pixel row, the scan signal and the sensing control signal may be applied to the first scan line SC1 and the first sensing control line SS1, respectively, in a period from t11 to t12, and the sensing operation may be performed on the blue sub-pixels Blue included in the first pixel row. In a period from t12 to t13, the sensing operation may be performed on the blue sub-pixels Blue included in the second pixel row. In this way, the sensing operation may be sequentially performed on the blue sub-pixels Blue connected to each pixel row.

After the sensing operation is performed on the blue sub-pixels Blue included in the n-th pixel row which is the last pixel row in a period from t15 to t16, the sensing operation may be terminated.

The first power source ELVDD may be applied to the pixel unit until the sensing operation for all sub-pixels included in the pixel unit is completed. Accordingly, as described with reference to FIG. 5A, when there is a sub-pixel in which the gate electrode and the source electrode of the driving transistor are short circuited among the plurality of sub-pixels, the light spot defect may occur in the corresponding sub-pixel.

A case in which the gate electrode and the source electrode of the driving transistor in a red sub-pixel Red in the first pixel row are short circuited will be described as an example. Even if the sensing operation for the corresponding sub-pixel is terminated at t2, the first power source ELVDD may be continuously applied to the corresponding sub-pixel until t16. In this case, as time elapses, charges may be accumulated in the parasitic capacitor Coled by a current flowing through the first electrode and the second electrode of the driving transistor T1. After a predetermined time has elapsed, a voltage equal to or greater than the threshold voltage of the light emitting element LD may be stored in the parasitic capacitor Coled. Accordingly, the light emitting element LD may emit light.

Figure 6A:
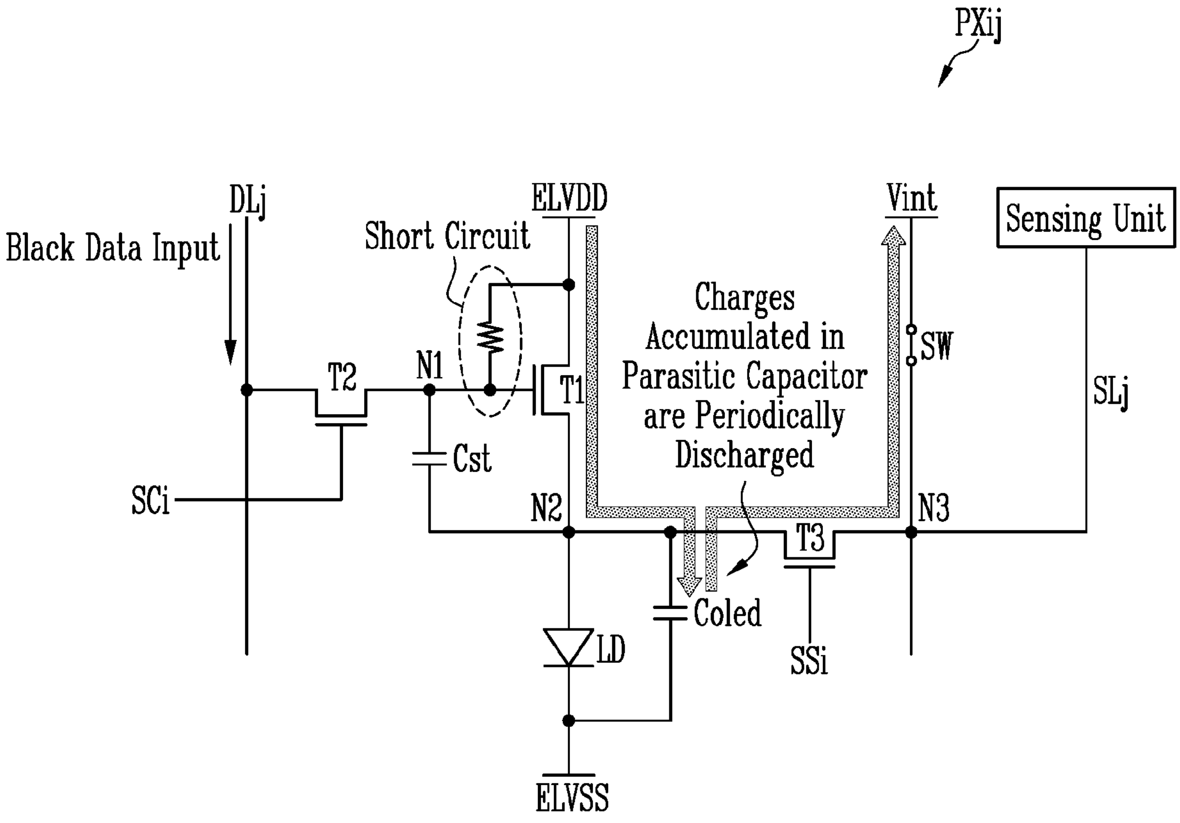
FIGS. 6A and 6B are diagrams for explaining an operation of the pixel circuit according to an embodiment for preventing occurrence of a light spot.
Figure 6B:
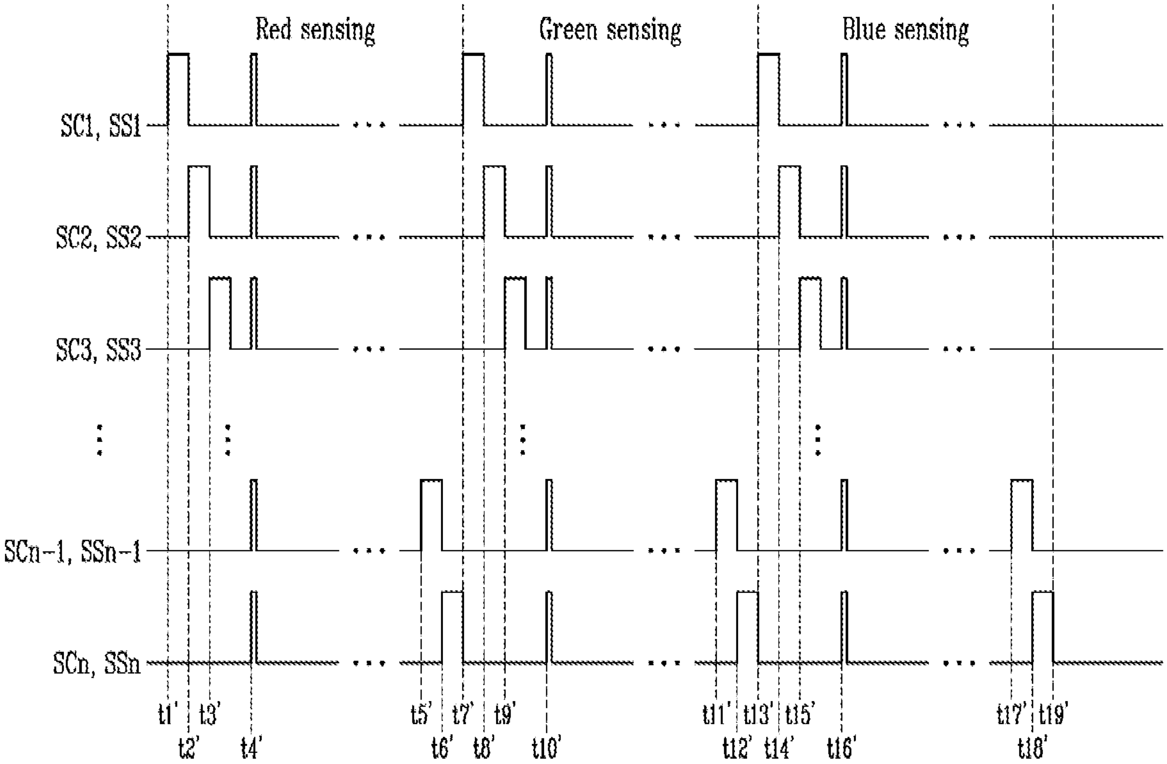

FIGS. 6A and 6B are diagrams for explaining an operation of the pixel circuit according to an embodiment for preventing occurrence of a light spot.

In an embodiment, during the sensing operation, since the display device may periodically discharge the charges accumulated in the parasitic capacitor Coled included in each of the plurality of sub-pixels, the light spot defect phenomenon described with reference to FIGS. 5A and 5B can be prevented.

Specifically, referring to FIG. 6A, when the gate electrode and the source electrode of the driving transistor T1 are short circuited, charges may be accumulated in the parasitic capacitor Coled by the current flowing through the first electrode and the second electrode of the driving transistor T1. In this case, a voltage having the magnitude greater than the threshold voltage of the light emitting element LD may be stored in the parasitic capacitor Coled.

In an embodiment, since the display device may discharge the charges stored in the parasitic capacitor Coled before the voltage greater than the threshold voltage of the light emitting element LD is stored in the parasitic capacitor Coled, the light spot defect phenomenon described with reference to FIGS. 5A and 5B can be prevented. That is, by periodically discharging the charges accumulated in the parasitic capacitor Coled until the sensing operation for all sub-pixels included in the pixel unit is completed, it is possible to prevent a specific sub-pixel from emitting light during the sensing operation. To this end, the sensing control signal may be periodically applied to the gate electrode of the sensing control transistor T3 during the sensing operation. In this case, the charges accumulated in the parasitic capacitor Coled may be discharged by connecting the second node N2 to the initialization power source Vint. Accordingly, since a voltage equal to or less than the threshold voltage of the light emitting element LD is stored in the parasitic capacitor Coled during the sensing operation, it is possible to prevent the light emitting element LD from emitting light.

FIG. 6B is a timing diagram illustrating an embodiment of signals applied to the plurality of scan lines SC1 to SCn and sensing control lines SC1 to SCn connected to the pixel unit as time elapses. A description of the contents overlapping with the contents described in FIG. 5B will be omitted.

Referring to FIG. 6B, when the sensing operation for the sub-pixels connected to three pixel rows is sequentially completed, a discharging operation for discharging the parasitic capacitor Coled may be performed. That is, after the scan signal and the sensing control signal are applied to a third scan line SC3 and a third sensing control line SS3, as the scan signal and the sensing control signal are simultaneously applied to all the scan lines SC1 to SCn and all the sensing control lines SS1 to SSn at t4', the charges stored in the parasitic capacitor Coled may be discharged. Then, after the scan signal and the sensing control signal are applied to fourth to sixth scan lines SC4 to SC6 and fourth to sixth sensing control lines SC4 to SC6, as the scan signal and the sensing control signal are simultaneously applied to all the sensing control lines SS1 to SSn, the charges stored in the parasitic capacitor Coled may be discharged. That is, during the sensing operation, since the scan signal and the sensing control signal may be simultaneously applied to the scan lines SC1 to SCn and the sensing control lines SS1 to SSn connected to the pixel unit at every predetermined discharge cycle, the light spot defect phenomenon can be improved.

In an embodiment, a discharge cycle may be set differently according to the length of time that the scan signal and the sensing control signal are applied to each sub-pixel during the sensing operation. For example, as the length of time during which the scan signal and the sensing control signal are applied to each sub-pixel during the sensing operation increases, a cycle during which the discharging operation is performed may be shortened.

In an embodiment, during the sensing operation, the threshold voltage or mobility of the driving transistor may be sensed. In general, in the case of the operation of sensing the threshold voltage of the driving transistor, the length of time during which the scan signal and the sensing control signal are applied to each sub-pixel may be longer than in the case of the operation of sensing the mobility of the driving transistor. Accordingly, in an embodiment, the discharge cycle in the operation of sensing the threshold voltage of the driving transistor may be shorter than the discharge cycle in the operation of sensing the mobility of the driving transistor. For example, in the case of the operation of sensing the mobility, the discharging operation may be performed whenever the sensing operation for the sub-pixels included in three pixel rows is sequentially completed. In addition, in the case of the operation of sensing the threshold voltage, the discharging operation may be performed whenever the sensing operation for the sub-pixels included in one pixel row is sequentially completed.

Figure 7:
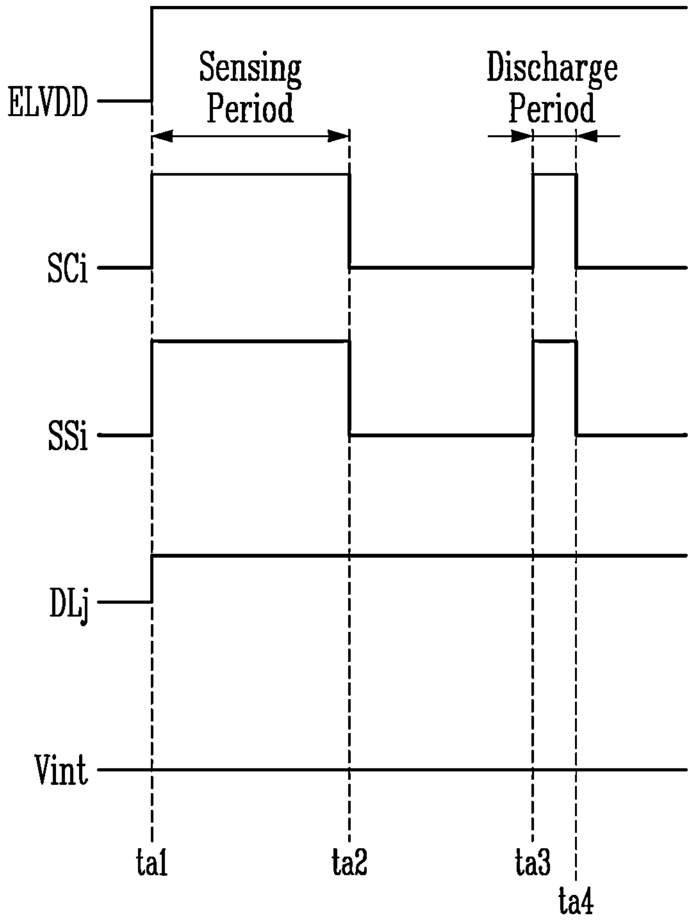
FIG. 7 is a timing diagram for explaining the sensing operation according to an embodiment.

FIG. 7 is a timing diagram for explaining the sensing operation according to an embodiment.

FIG. 7 may show signals applied to an arbitrary sub-pixel PXij included in an i-th pixel row among a plurality of pixel rows included in the pixel unit during the sensing operation and the discharging operation.

In FIG. 7, a period from ta1 to ta2 may be a sensing period in which the mobility or threshold voltage of the driving transistor included in the sub-pixel PXij is sensed. A period from ta3 to ta4 may be a discharge period in which the discharging operation for discharging the parasitic capacitor Coled in the sub-pixel PXij is performed.

Referring to the pixel circuit of FIG. 6A and the timing diagram of FIG. 7, at ta1, a high level voltage may be applied as the first power source ELVDD, the scan signal and the sensing control signal may be applied to an i-th scan line SCi and an i-th sensing control line SSi, respectively, and the data signal may be applied to the j-th data line DLj. A voltage applied to the j-th data line DLj may be a voltage corresponding to the black grayscale. The scan signal and the sensing control signal may be applied in the period from ta1 to ta2, and the sensing operation for the sub-pixel PXij may be performed during this time.

Specifically, the switching transistor T2 and the sensing control transistor T3 may be turned on by the scan signal and the sensing control signal applied to the i-th scan line SCi and the i-th sensing control line SSi, and charges may be stored in the parasitic capacitor Coled by the current flowing through the first electrode and the second electrode of the driving transistor T1 during the period from ta1 to ta2. Accordingly, the potential of the second node may increase. In an embodiment, when the charges accumulated in the parasitic capacitor Coled during the period from ta1 to ta2 are transferred to the sensing unit as the sensing signal, the sensing operation for the sub-pixel PXij may be completed. In an embodiment, when the voltage or current of the second node is transmitted to the sensing unit as the sensing signal, the sensing operation for the sub-pixel PXij may be completed.

However, as described with reference to FIG. 5A, when the gate electrode and the source electrode of the driving transistor T1 are short circuited, charges may be continuously accumulated in the parasitic capacitor Coled even after ta2. According to an embodiment, since the scan signal and the sensing control signal may be applied to the i-th scan line SCi and the i-th sensing control line SSi, respectively, during the period from ta3 to ta4, the charges accumulated in the parasitic capacitor Coled during a period from ta2 to ta3 may be discharged. In this case, at ta3, the scan signal and the sensing control signal may be simultaneously applied to all the scan lines SC1 to SCn and sensing control lines SS1 to SSn. As the charges accumulated in the parasitic capacitor Coled are periodically discharged, the light spot defect phenomenon that may occur in a specific pixel can be improved.

Figure 8:
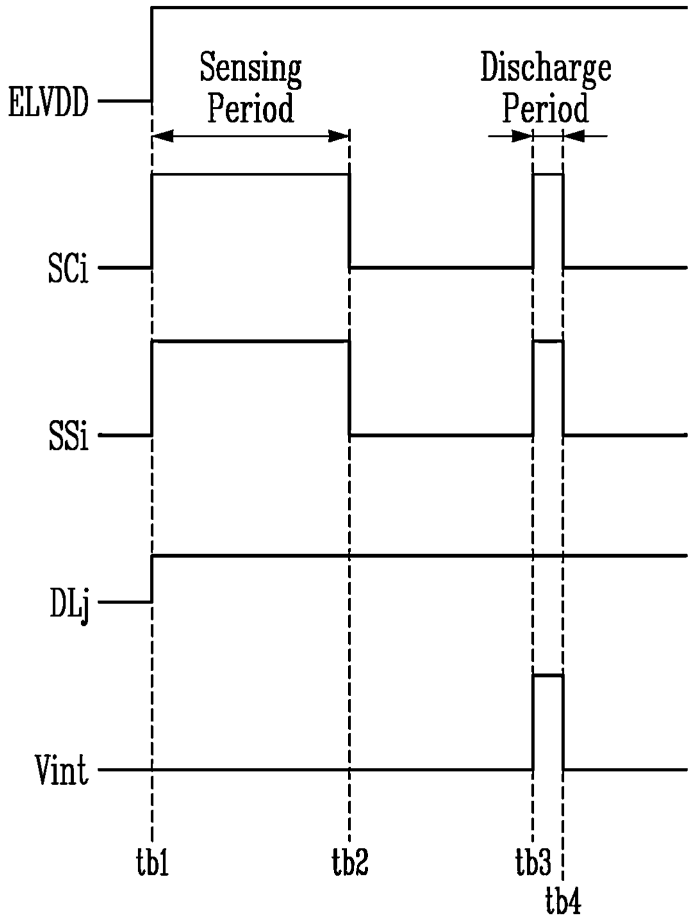
FIG. 8 is a timing diagram for explaining the sensing operation according to another embodiment.

FIG. 8 is a timing diagram for explaining the sensing operation according to another embodiment.

In FIG. 8, a period from tb1 to tb2 may be the sensing period in which the mobility or threshold voltage of the driving transistor included in the sub-pixel PXij is sensed. A period from tb3 to tb4 may be the discharge period in which the discharging operation for discharging the parasitic capacitor Coled in the sub-pixel PXij is performed.

Compared with the timing diagram of FIG. 7, in the case of FIG. 8, a high level voltage may be applied as the initialization voltage during the discharging operation. For example, during the sensing operation, a first initialization voltage having a low level may be applied as the initialization voltage, and during the discharging operation, a second initialization voltage having a high level higher than the first initialization voltage may be applied. In this case, in the case of the discharging operation of FIG. 8, the amount of charges discharged from the parasitic capacitor Coled may be smaller than that of the discharging operation described with reference to FIG. 7. Accordingly, in the case of the discharging operation of FIG. 8, the discharging operation may be performed faster than the discharging operation of FIG. 7. Accordingly, during the discharging operation, the time for which the scan signal and the sensing signal are applied to the sub-pixels can be reduced. Referring to FIG. 8, in the period from tb3 to tb4, the discharging operation may be performed. This may be shorter than the period ta3 to ta4 during which the discharging operation is performed in the embodiment of FIG. 7. That is, by appropriately adjusting the magnitude of the initialization voltage applied to the second node N2 during the discharging operation, the time required for the discharging operation in an entire sensing operation can be reduced.

Figure 9:
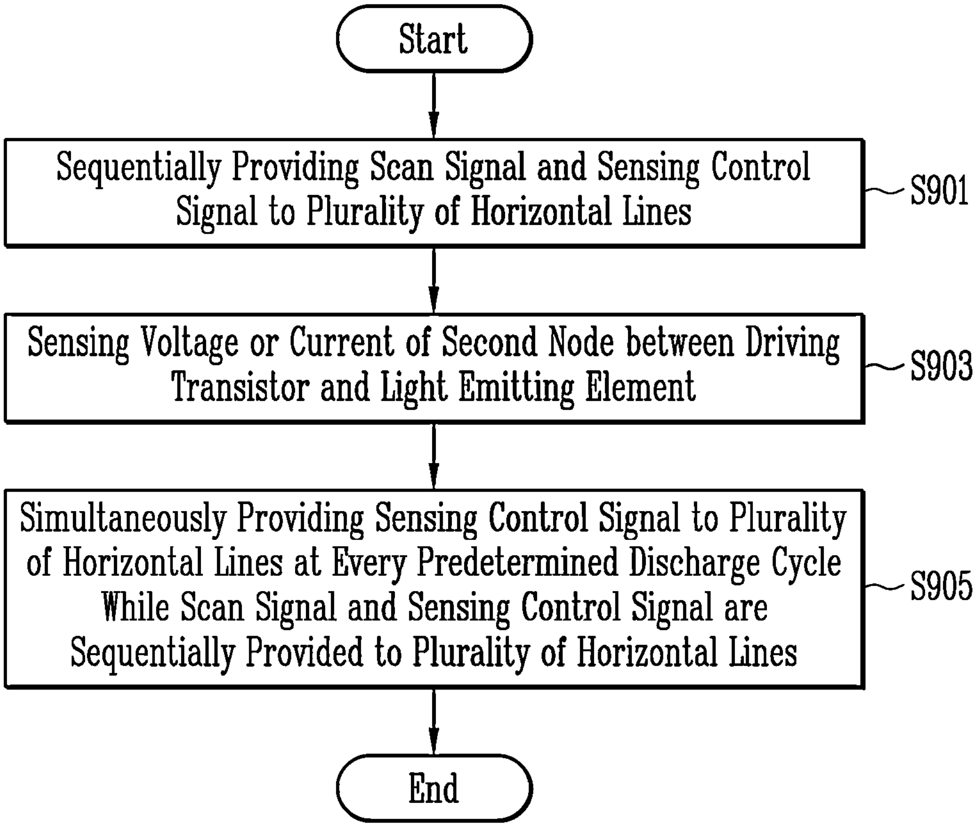
FIG. 9 is a flowchart for explaining the sensing operation of the display device according to an embodiment.

FIG. 9 is a flowchart for explaining the sensing operation of the display device according to an embodiment.

In step S901, the display device may sequentially provide the scan signal and the sensing control signal to the plurality of horizontal lines. The scan signal may be a signal for turning on the switching transistor T2 included in each of the plurality of pixel circuits. The sensing control signal may be a signal for turning on the sensing control transistor T3 included in each of the plurality of pixel circuits. Although not shown in FIG. 9, when the sensing control transistor T3 is turned on, the second node N2 between the driving transistor T1 and the light emitting element LD may be initialized. After the initialization voltage is applied to the second node, the switch connected between the sensing control transistor and the initialization power source may be opened. After the switch connected between the sensing control transistor and the initialization power source is opened, a predetermined amount of charges may be stored in the parasitic capacitor of the light emitting element by the current flowing through the driving transistor.

In step S903, the display device may sense the voltage or current of the second node. The display device may acquire information on the mobility or threshold voltage of the driving transistor based on the sensed voltage or current of the second node.

In step S905, while the scan signal and the sensing control signal are sequentially provided to the plurality of horizontal lines, the display device may simultaneously provide the sensing control signal to the plurality of horizontal lines at every predetermined discharge cycle. Accordingly, the charges accumulated in the parasitic capacitor of the light emitting element may be discharged at every predetermined discharge cycle.

The display device according to the embodiments of the present inventive concept may prevent an unintentional light spot from occurring in the display device when the display device is driven or in the sensing operation.

The drawings referred to heretofore and the detailed description of the inventive concept described above are merely illustrative of the inventive concept. It is to be understood that the inventive concept has been disclosed for illustrative purposes only and is not intended to limit the meaning or scope of the inventive concept as set forth in the claims. Therefore, those skilled in the art will appreciate that various modifications and equivalent embodiments are possible without departing from the scope of the inventive concept. Accordingly, the true technical protection scope of the inventive concept should be determined by the technical idea of the appended claims.

What is claimed is:

1. A display device for performing a sensing operation comprising:

a pixel unit including a plurality of pixel circuits each including a light emitting element, a driving transistor connected between an anode electrode of the light emitting element and a first power source, a switching transistor connected between a gate electrode of the driving transistor and a data line, and a sensing control transistor connected between the anode electrode and an initialization power source;

a scan driver connected to the plurality of pixel circuits through a plurality of horizontal lines and sequentially outputting scan signals for turning on the plurality of switching transistors included in the plurality of pixel circuits and sensing control signals for turning on sensing control transistors included in the plurality of pixel circuits to the plurality of horizontal lines; and a sensing unit configured to sense voltages or current of a plurality of first nodes each disposed between a respective anode electrode and a respective driving transistor, wherein the scan driver simultaneously outputs the sensing control signals to all of the plurality of horizontal lines at every predetermined discharge cycle during the sensing operation.

2. The display device of claim 1, wherein each of the plurality of pixel circuits further includes:

a storage capacitor connected between the first node and a second node disposed between the gate electrode of the driving transistor and the switching transistor; and wherein the initialization power source is connected to one electrode of each of the sensing control transistors in parallel with the sensing unit to supply a first initialization voltage to the first node during the sensing operation.

3. The display device of claim 2, further comprising:

a timing controller controlling the sensing unit and the scan driver, wherein the timing controller controls the sensing unit and the scan driver so that the each of the sensing control transistors is turned on at every predetermined discharge cycle during the sensing operation to supply a second initialization voltage from the initialization power source to the first node.

4. The display device of claim 3, wherein a level of the second initialization voltage is higher than a level of the first initialization voltage.

5. The display device of claim 2, wherein a voltage applied to the gate electrode of the driving transistor through the data line during the sensing operation is a voltage corresponding to a black grayscale.

6. The display device of claim 1, wherein the sensing operation is performed during any one of a period in which the display device is powered on, a period in which the display device is powered off, or a blank period in which input image data is not input within one frame while the display device is driven.

7. The display device of claim 6, wherein the sensing operation is an operation for acquiring at least one of a threshold voltage and mobility of the driving transistor.

8. The display device of claim 7, wherein a discharge period of the sensing operation for acquiring the threshold voltage of the driving transistor is longer than a discharge period of the sensing operation for acquiring the mobility of the driving transistor.

9. The display device of claim 1, wherein the scan driver simultaneously provides the scan signals together with the sensing control signals to the plurality of horizontal lines at every predetermined discharge cycle.

10. The display device of claim 1, wherein the plurality of first nodes are discharged to an initialization voltage when the scan driver simultaneously provides the sensing control signals to all of the plurality of horizontal lines.

11. A driving method of a display device including a plurality of pixel circuits connected to a plurality of horizontal lines, each of the plurality of pixel circuits including a light emitting element and a driving transistor connected between the light emitting element and a first power source, comprising:

sequentially providing scan signals, each of the scan signals being configured to turn on a switching transistor connected between the driving transistor and a data line, and sensing control signals, each of the sensing control signals being configured to turn on a sensing control transistor connected between a respective first node, which is disposed between the driving transistor and an anode electrode of the light emitting element, and an initialization power source, to the plurality of horizontal lines;

sensing voltages or current of a plurality of first nodes each disposed between the driving transistor and the anode electrode of the light emitting element; and simultaneously providing the sensing control signals to all of the plurality of horizontal lines at every predetermined discharge cycle during a sensing operation.

12. The driving method of claim 11, wherein each of the plurality of pixel circuits further includes a storage capacitor connected between a gate electrode of the driving transistor and the anode electrode, and wherein an amount of charges accumulated in a parasitic capacitor in each of the plurality of pixel circuits is discharged when a sensing control signal is applied to a gate electrode of the sensing control transistor at every predetermined discharge cycle.

13. The driving method of claim 11, wherein the sequentially providing the scan signals and the sensing control signals, the sensing the voltages or the current of the plurality of first nodes, and the simultaneously providing the sensing control signals are performed during any one of a period in which the display device is powered on, a period in which the display device is powered off, or a blank period in which input image data is not input within one frame while the display device is driven.

14. The driving method of claim 13, further comprising:

acquiring information on a threshold voltage or mobility of the driving transistor based on a sensed voltage or current of a respective first node.

15. The driving method of claim 14, wherein a discharge period when information on the threshold voltage of the driving transistor is acquired is longer than a discharge period when information on the mobility of the driving transistor is acquired.

16. The driving method of claim 11, wherein the simultaneously providing the sensing control signals to the plurality of horizontal lines at every predetermined discharge cycle includes:

simultaneously providing the plurality of scan signals for turning on switching transistors included in the plurality of pixel circuits to the plurality of horizontal lines together with the sensing control signals at every predetermined discharge cycle.

17. The driving method of claim 11, wherein the sequentially providing the sensing control signals to the plurality of horizontal lines includes:

providing a first initialization voltage from the initialization power source to the plurality of first nodes in the plurality of pixel circuits, and wherein the simultaneously providing the sensing control signals to the plurality of horizontal lines at every predetermined discharge cycle includes:

providing a second initialization voltage from the initialization power source to the plurality of first nodes in the plurality of pixel circuits.

18. The driving method of claim 17, wherein a level of the second initialization voltage is higher than a level of the first initialization voltage.

19. The driving method of claim 11, further comprising:

applying a data voltage to a gate electrode of the driving transistor through the data line, wherein the data voltage is a voltage corresponding to a black grayscale.

20. The display device of claim 11, wherein the plurality of first nodes are discharged to an initialization voltage when simultaneously providing the sensing control signals to all of the plurality of horizontal lines.

* * * * *